Jan. 7, 1964      R. M. BUCHWALD      3,116,803
VEHICLE ENGINE EXHAUST SYSTEM
Filed June 13, 1961
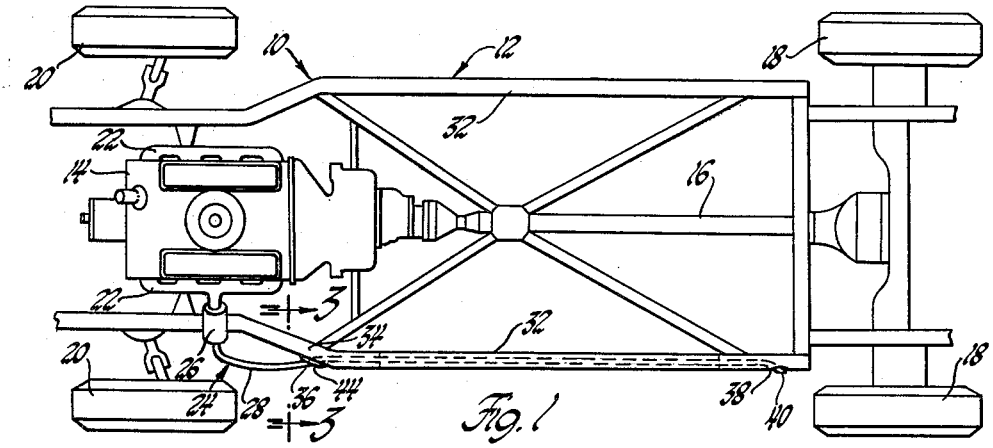
INVENTOR.
Robert M. Buchwald
BY
D. D. McGraw
ATTORNEY

United States Patent Office 3,116,803
Patented Jan. 7, 1964

3,116,803
VEHICLE ENGINE EXHAUST SYSTEM
Robert M. Buchwald, Berkley, Mich., assignor to General Motors Corporation, Detroit, Mich., a corporation of Delaware
Filed June 13, 1961, Ser. No. 116,792
5 Claims. (Cl. 180—64)

The invention relates to an exhaust system for an engine installed in a motor vehicle, and more particularly to an exhaust system wherein the exhaust pipe conducts the exhaust gases from an engine exhaust manifold through an insulated vehicle frame member to the rear portion of the vehicle. A feature of the invention includes the frame member insulation construction and the mounting arrangement of the exhaust pipe in the frame member. Another feature of the invention is the frame member pipe entry construction wherein the exhaust pipe is led into the frame member while retaining the same frame member strength and deflection characteristics as the member would have had if no exhaust pipe entry had been provided.

It is desirable in motor vehicles to conduct the exhaust gases from a front mounted engine to the rear of a vehicle for dispersion to the atmosphere, and to provide an exhaust pipe arrangement which will have a minimum exposure to exterior corrosive elements. It is also desirable to have an exhaust pipe arrangement occupy the minimum necessary space not otherwise allocated to vehicle structure so as to give greater freedom to the design and location of portions of the vehicle body. The exhaust pipe arrangement should be readily installed and removed, and should not transmit an undue amount of heat to other portions of the vehicle while the engine is operating. The exhaust system embodying the invention obtains these desirable results by routing the exhaust pipe through a suitable frame member, such as a tubular side rail, and mounting the exhaust pipe in spaced relation in the side rail, with a suitable insulating materal beng provided as a part of the side rail installation. A ball joint type mount, which is spring loaded to permit limited movement of the exhaust pipe as the engine moves relative to the vehicle frame, is also provided.

In the drawings:

FIGURE 1 is a schematic plan view of a portion of a motor vehicle having an exhaust system embodying the invention installed in one side thereof;

FIGURE 2 is a section view of the exhaust pipe mounting arrangement of the exhaust system of FIGURE 1 with parts broken away;

FIGURE 3 is a partial view of the exhaust system of FIGURE 1 taken in the direction of arrows 3—3 of that figure and having parts broken away; and FIGURE 4 is a sectional view of a portion of the exhaust system of FIGURE 1 as taken in the direction of arrows 4—4 of FIGURE 2 with parts broken away.

The vehicle 10, schematically illustrated in FIGURE 1, includes a frame 12, an engine 14 mounted in the forward part of the vehicle, a vehicle drive line 16 leading to the rear wheels 18, and front wheels 20. The engine 14 is provided with exhaust manifolds 22 and an exhaust system 24 conducting exhaust gases from the manifolds to the atmosphere. The exhaust system 24 may be of the dual exhaust type, if desired, or a crossover arrangement may be provided so that a single exhaust pipe conducts all of the exhaust gases from both manifolds to the atmosphere. For purposes of illustration, the exhaust system 24 includes the muffler 26, the exhaust pipe 28 and an exhaust pipe mounting arrangement 30 on one side of the vehicle 10. If a dual exhaust system is provided, a similar muffler and exhaust pipe installation would be made on the other side of the vehicle.

The frame 12 has frame side rail members 32 extending longitudinally of the vehicle and bent inwardly and upwardly at 34 in the usual manner so as to provide sufficient clearance for the front wheels and suspension system, as well as a suitable engine mounting arrangement. It is particularly desired that the portion of side rail 32 rearwardly of the bend 34 be tubular in formation and in the illustration is shown as having a circular cross section although other cross sections may be used when proper considerations are given to the installation of the insulaton material to be described. The exhaust pipe 28 enters the interior of side rail 32 at 36 and extends through that side rail in spaced relation to the inner surfaces thereof to an exit point 38 adjacent the rear end of the vehicle 10. The rear end 40 of the exhaust pipe 28 is then formed to extend through the side rail opening 42 so as to discharge the exhaust gases to the atmosphere. A flange 44 extends through the opening 46 forming the point of entry 36 in the side rail 32 and extends inwardly beyond the inner surface of the rail as well as outwardly beyond the rail outer surface. Flange 44 is sufficiently strong to restore the rail 32 to its original strength and deflection characteristics realized if the opening 46 had not been provided. The exhaust pipe 28 preferably extends substantially along the axis of the opening 46 so that the flange 44 is in annularly spaced relation to the pipe 28. Pipe 28 also extends substantially along the axis of side rail 32. An insulating material 48 is provided adjacent the interior surface 50 of the tubular side rail 32 and may be of any suitable type. It is preferable, however, that it be pleated, as best illustrated in FIGURE 4, or otherwise formed so that it may be readily inserted in the rear opening 52 of side rail 32 while in a rolled or collapsed condition and expanded to engage the rail inner surface 50 along substantially the entire distance between the point of entry 36 and the point of exit 38 of the exhaust pipe 28 before the pipe 28 is installed. The insulating material 48 is preferably spaced well away from the exhaust pipe 28 so that a flow of air through opening 46, the side raid 32 along the pipe 28 and out openings 42 and 52 may be realized when the vehicle is moving. This will provide additional heat insulation by transferring some of the exhaust gas heat to the air passing therethrough. A suitable exhaust pipe hanger of any well known type may be provided adjacent the front end of the exhaust pipe if such is necessary to maintain the exhaust pipe in substantially the center of the opening 46. In many installations, however, such a hanger will not be necessary since the front end of the exhaust pipe is close coupled to the engine manifold 22.

The rear exhaust mounting arrangement 30 includes a mounting bracket 54 which may be in the form of a cup having openings 56 cut through the base portion thereof to provide bracket webs 58 interconnecting the bracket annulus 60 with the spherically depressed bracket center 62. Center 62 is substantially hemispherical and is provided with a central opening 64 through which a rod 66 welded at 68 to exhaust pipe 28 extends. A mating spherically formed cup 70 is received about rod 66 on the side of center 62 opposite pipe 28 and provides a spring seat for spring 72 which is held against cup 70 by the nut and washer assembly 74 threaded on the end of rod 66. A key 76 may be provided to prevent the assembly 74 from backing off. A ball section 78 is received on rod 66 on the other side of bracket 62 from cup 70 and has an annular curved surface which may be formed with a radius slightly smaller than the inner radius of the spherical depression in center 62. A spring 80 received about rod 66 and acting against a spring seat 82 secured to the rod holds ball section 78 in tight engagement with center 62 when assembly 74 is tightened so that springs 72 and 80 are depressed. This provides a ball joint mounting arrangement for the exhaust pipe 28 which may be assembled after the exhaust pipe is in place and may be disassembled to permit removal of the exhaust pipe when necessary.

The exhaust system embodying the invention provides a compact unit occupying what would otherwise be unused space in that it extends through a tubular frame member, and is insulated from the remainder of the vehicle at points immediately adjacent the hot exhaust pipe to prevent heat transfer to other vehicle portions.

I claim:

1. A vehicle having a tubular frame member and an exhaust pipe extending therethrough, means defining an exhaust pipe entry into said frame member and strengthening the frame member so that the frame member is equal in strength to a frame member having no pipe entry therein, exhaust pipe insulating means received in said frame member in spaced relation to said pipe, opening means in said frame member providing a pipe exit, said frame entry and said insulating means and said opening means permitting cooling air to flow through said frame member along said pipe and receiving heat therefrom and discharging the heat to the atmosphere, and ball joint means mounting said pipe in said frame member and holding said pipe in spaced relation to said insulating means including a pipe support rod secured to said pipe and universally connected to said ball joint means, and ball joint means being supported within said tubular frame member.

2. A vehicle having a tubular frame member and an exhaust pipe extending therethrough, first opening means in said frame member defining an exhaust pipe entry and being substantially larger than said pipe diameter, second opening means in said frame member providing an exhaust pipe exit and being substantially larger than the diameter of said pipe, support means on said frame member for supporting said exhaust pipe centrally therein, and insulation means positionable within said frame member being engageable with the inner walls thereof and radially spaced from said exhaust pipe, said first opening means, tubular frame member, insulation means, and exhaust pipe being aligned and positioned relative to said vehicle to permit cooling air generated by the forward motion of the vehicle to flow naturally through said frame member and in direct heat exchange relationship with said pipe receiving heat therefrom and discharging the heat to the atmosphere through said second opening means.

3. A vehicle having a tubular frame member and an exhaust pipe extending therethrough, first opening means in said frame member defining an exhaust pipe entry and strengthening the frame member so that the frame member is equal in strength to one having no pipe entry therein, said first opening means being substantially larger than said pipe diameter, exhaust pipe insulating means received in said frame member in spaced relation to said pipe, second opening means in said frame member providing an exhaust pipe exit and being substantially larger than the diameter of said pipe, support means within said frame member for supporting said exhaust pipe centrally therein, said first opening means, insulating means, frame member, and exhaust pipe being aligned relative to the vehicle to permit cooling air generated by the forward motion of the vehicle to flow naturally through said frame member and between said pipe and insulating means to receive heat therefrom and discharge the heat to the atmosphere through said second opening means.

4. A vehicle having a tubular frame member and an exhaust pipe extending therethrough, first opening means in said frame member defining an exhaust pipe entry and strengthening said frame member so that the frame member is equal in strength to one having no pipe entry therein, said first opening means being substantially larger than said exhaust pipe diameter, exhaust pipe insulating means received in said frame member in spaced relation to said pipe, said insulating means having pleated walls to insure uniform resilient contact with the walls of said frame member, support means within said frame member and supporting the rearward end of said exhaust pipe and cooperating with a forward connection of said exhaust pipe with an engine to support said exhaust pipe centrally in said frame member, second opening means in said frame member providing an exhaust pipe exit, said second opening means being substantially larger than the diameter of said pipe, said first opening means, insulating means, frame member, and exhaust pipe being aligned and located relative to the vehicle to permit cooling air generated by the forward motion of the vehicle to flow between said pipe and insulating means receiving heat therefrom and discharging the heat to the atmosphere through said second opening means.

5. The device as described in claim 4 wherein said support means comprises, ball joint means supported axially of said frame member and being adapted to support the rearward end of said pipe and hold said pipe in spaced relation to said insulating means and centrally in said frame member in cooperation with the exhaust pipe forward connection with an engine, said ball joint means including a pipe support rod secured to said pipe and projecting into said ball joint means for universal connection therewith, said ball joint means being supported within said tubular frame member rearward of said second opening means.

References Cited in the file of this patent

UNITED STATES PATENTS

| 1,824,717 | Harty et al. | Sept. 22, 1931 |
| 1,856,005 | Tomshow | Apr. 26, 1932 |
| 2,138,001 | Fluor | Nov. 29, 1938 |
| 2,875,841 | Henderson | Mar. 3, 1959 |

FOREIGN PATENTS

| 743,439 | Germany | Dec. 27, 1943 |